United States Patent
Zou et al.

(10) Patent No.: US 7,599,047 B2
(45) Date of Patent: Oct. 6, 2009

(54) METHOD AND SYSTEM FOR SIMULTANEOUS MEASUREMENT OF STRAIN AND TEMPERATURE

(75) Inventors: Lufan Zou, Ottawa (CA); Omur M. Sezerman, Kanata (CA)

(73) Assignee: Oz Optics Ltd., Nepean (CA)

( * ) Notice: Subject to any disclaimer, the term of this patent is extended or adjusted under 35 U.S.C. 154(b) by 162 days.

(21) Appl. No.: 11/818,966

(22) Filed: Oct. 18, 2007

(65) Prior Publication Data

US 2008/0239282 A1    Oct. 2, 2008

Related U.S. Application Data

(60) Provisional application No. 60/853,001, filed on Oct. 20, 2006.

(51) Int. Cl.
*G01B 11/16* (2006.01)

(52) U.S. Cl. .......................... 356/32; 356/34; 356/35.5; 356/320

(58) Field of Classification Search ................... 356/32, 356/34, 35.5, 320
See application file for complete search history.

(56) References Cited

U.S. PATENT DOCUMENTS

| 6,813,403 | B2 * | 11/2004 | Tennyson | ...................... 385/12 |
| 2003/0174924 | A1 * | 9/2003 | Tennyson | ...................... 385/12 |
| 2008/0084914 | A1 * | 4/2008 | Yamamoto et al. | .......... 374/137 |

* cited by examiner

*Primary Examiner*—Roy Punnoose
(74) *Attorney, Agent, or Firm*—Jones, Tullar & Cooper, P.C.

(57) ABSTRACT

A method and system for simultaneously measuring strain and temperature characteristics of an object involves the attachment to the object of a pair of optical fibers having different refractive indices, the fibers being connected together at least one end thereof, and directing laser light into at least one end of the fibers. The Brillouin frequency of each of the fibers is measure and the strain and temperature characteristics are calculated based on the coefficients of strain and temperature and the measured Brillouin frequencies of the fibers.

13 Claims, 5 Drawing Sheets

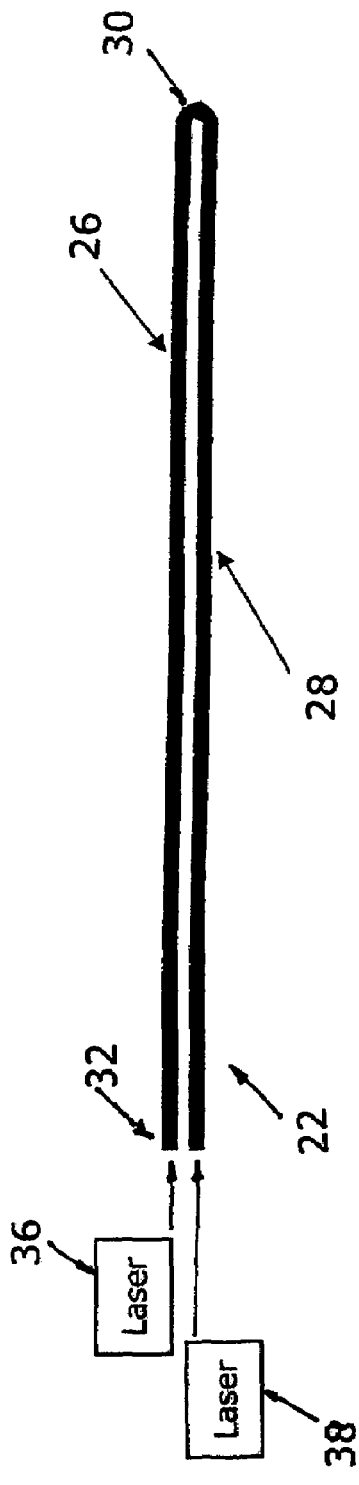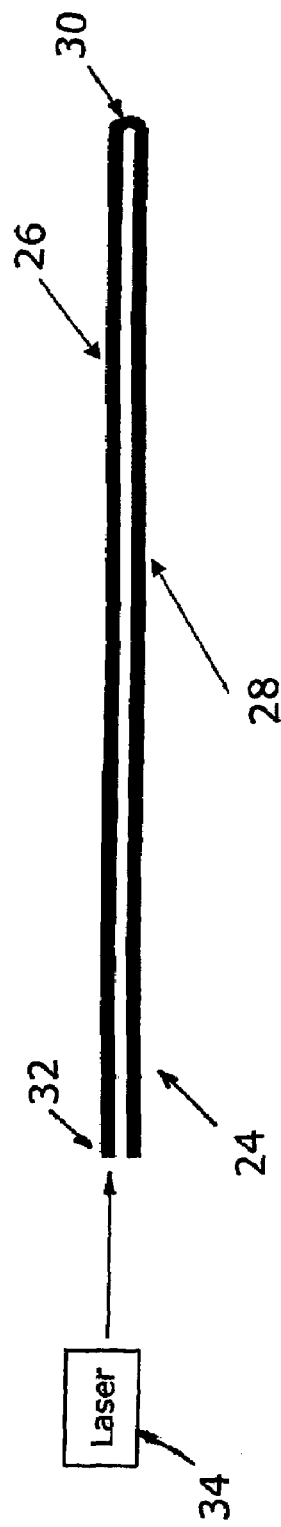

46  40  44  42

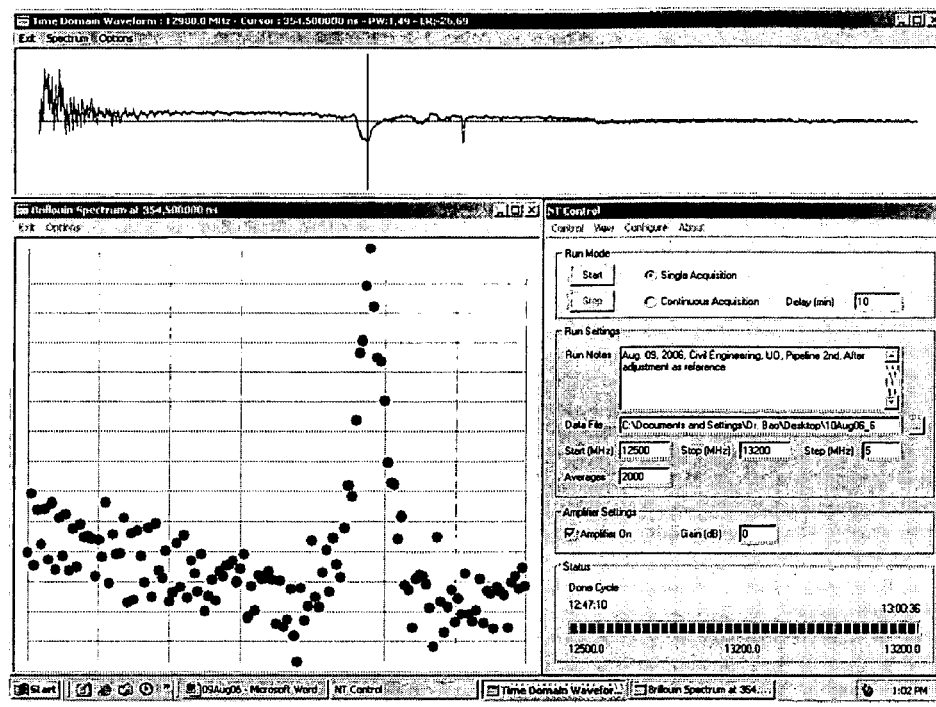
Figure 9A  $v_B$=12980 MHz, located at 354.5ns from SMF-28
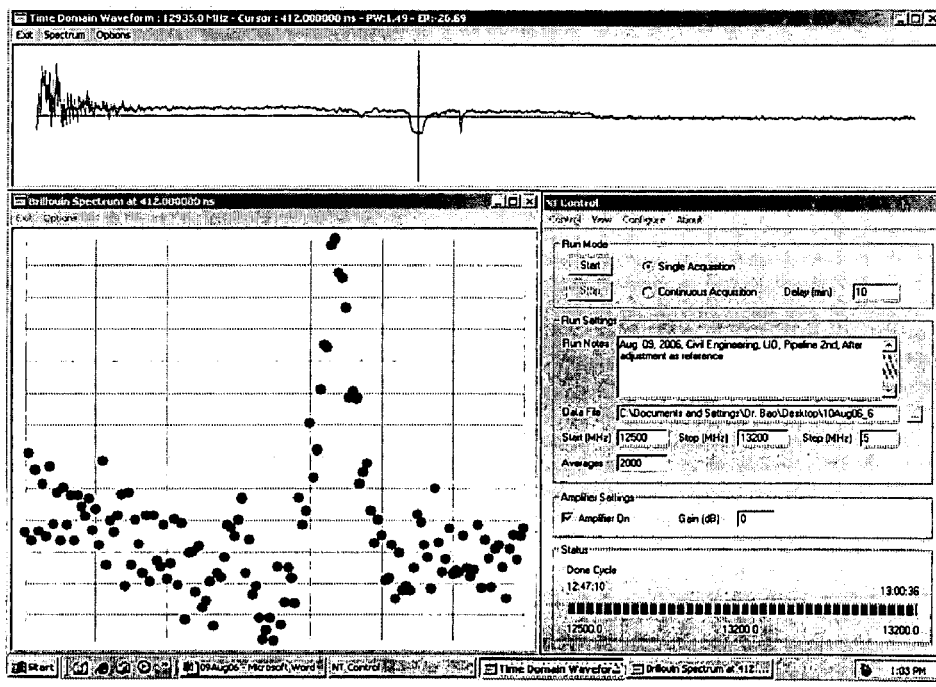
Figure 9B  $v_B$=12935 MHz, located at 412ns from other SMF

METHOD AND SYSTEM FOR SIMULTANEOUS MEASUREMENT OF STRAIN AND TEMPERATURE

CROSS REFERENCE TO RELATED APPLICATIONS

This application claims priority under 35 U.S.C. 119(e) on and claims the benefit of U.S. Provisional Application No. 60/853,001 filed Oct. 20, 2006, which is hereby incorporated by reference in its entirety.

BACKGROUND OF THE INVENTION

The present invention relates to a method and system for the simultaneous measurement of strain and temperature utilizing principles associated with Brillouin scattering.

Brillouin scattering is an inelastic or nonlinear scattering of light from acoustic phonons in a dielectric material, such as an optical fiber. Brillouin scattering can be spontaneous, as when light in a fiber interacts with density variations in the fiber, or it can be stimulated. The Brillouin frequency is the difference between the frequencies of the input and scattered beams of light within the fiber. The Brillouin frequency can be described by the equation:

$$V_B = \frac{2nV_a}{\lambda_p} \sin\frac{\theta}{2} \quad (1)$$

where: $V_a$ is the sound velocity in the optical fiber;

n is the refractive index;

$\lambda_p$ is the wavelength of the pump laser.

The Brillouin frequency is a physical property that is related to temperature and strain within the optical fiber, in accordance with the following equation:

$$V_B = V_{B0} + C_T(T-T_0) + C_\epsilon(\epsilon-\epsilon_0) \quad (2)$$

where $C_T$ and $C_\epsilon$ are coefficients of temperature (T) and strain ($\epsilon$), respectively. These coefficients are determined experimentally for each fiber.

With Brillouin amplification, the scattered light is amplified. There can be an energy exchange between two counter-propagating laser beams, which exchange is maximum when $V_1-V_2=V_B$.

The Brillouin frequency spectrum is obtained by scanning the beat frequency of the fiber. It is characterized by the peak power, the shape of the frequency curve, the center frequency, and the linewidth, with full linewidth occurring at half-maximum (see FIG. 1).

It has been known that the principles of Brillouin scattering can be used to measure strain or temperature in an optical fiber. Because there is only one peak of a Brillouin spectrum from a single mode fiber (eg. SMF-28) and because strain and temperature change simultaneously in accordance with equation 2, it is impossible to simultaneously extract information respecting both strain and temperature from a single peak of the Brillouin spectrum.

In the past, when is has been desired to measure both strain and temperature simultaneously, it has been necessary to take special measures to achieve these measurements. For example, if temperature is maintained constant it is possible to measure strain, or if the strain is maintained constant it is possible to measure temperature. Another measure would be to install an additional fiber for temperature measurement in order to compensate for the temperature influence on the Brillouin spectrum caused by both temperature and strain. One then could measure both the Brillouin frequency and the intensity of the Brillouin spectrum. Alternatively, one can use special fibers, such as photonic crystal fiber (PCF), or large effective area fiber (LEAF) as the sensing media. FIG. 2 shows simultaneous measurement of strain and temperature using PCF and LEAF.

FIG. 3 shows the effect of temperature with such measurements, where it is seen that the central frequencies of the peaks at a and c increased linearly with temperature. The temperature coefficients are 0.96 for peak a and 1.23 MHz/° C. for peak c at 1320 nm. The pulse width was 1.5 ns~15 cm spatial resolution.

FIG. 4 shows the effect of strain with such measurements, where it is seen that the Brillouin frequencies of peaks a and c have a linear dependence on the strain. The strain coefficients are $4.78 \times 10^{-2}$ for peak a and $5.5 \times 10^{-2}$ MHz/µε for peak c at 1320 nm. The pulse width was 1.5 ns~15 cm spatial resolution.

There are disadvantages to using PCF or LEAF for simultaneous measurement of strain and temperature. In real-life applications, peak c is easily covered by the noise resulting in a low signal to noise ratio. The intensity of the peak may vary greatly because of tension or compression in the fiber. In order to increase the spatial resolution, an increased baseline for the input pulses may be required, resulting in a complication of the Brillouin spectrum, and increased difficulties in identifying peak c.

There is therefore a need to devise a method and a system for the simultaneous measurement of strain and temperature in an optical fiber, and which does not suffer from the drawbacks associated with present methods and systems.

SUMMARY OF THE INVENTION

The present provides a method and a system which meets the above requirements. The present invention utilizes a pair of fibers connected or installed together, with one of the fibers having a refractive index that differs from that of the other fiber. For example, a first fiber uses pure silica as the cladding and pure silica doped with Ge as the core, and the second fiber uses pure silica doped with F as the cladding and pure silica as the core. Another example has a first fiber using pure silica as the cladding and pure silica doped with Ge as the core, and a second fiber using pure silica as the cladding and pure silica doped with a different dose of Ge as the core, such as SMF-28 and LEAF. Preferred fibers for this invention are single mode fibers (SMF), because they are cheaper and more conventional.

The first and second fibers can be connected to a splitter at each end thereof, or they can be spliced together at one end only. In the first case, the splitters would be used as input/output or inputs of probe and pump lasers. In the second case the non-spliced ends of the fibers would be used for input/output of a single laser or as inputs of probe and pump lasers.

Broadly speaking, therefore, the present invention can be considered as providing a method of simultaneously determining strain and temperature characteristics of an object comprising the steps of: providing first and second optical fibers having different refractive indices; determining coefficients of strain and temperature for each of the fibers; connecting the fibers together at least one end thereof; securing the fibers to the object along a length thereof; inputting laser light into at least one of the fibers at the other ends thereof; measuring the Brillouin frequency for each of the fibers; and calculating strain and temperature characteristics based on the coefficients of strain and temperature and the measured Brillouin frequencies for the fibers.

The present invention also contemplates a system for simultaneously determining strain and temperature characteristics of an object comprising: first and second optical fibers having different refractive indices; means connecting the first and second fibers together at least one end thereof; means securing the fibers to the object to be monitored; laser means for inputting laser light into at least one of the fibers at the other ends thereof; means for measuring the Brillouin frequency for each of the fibers; and means for calculating strain and temperature characteristics based on the coefficients of strain and temperature as well as the measured Brillouin frequencies for the fibers.

BRIEF DESCRIPTION OF THE DRAWINGS

FIGS. 6a and 6b show alternative arrangements of optical fibers in accordance with the present invention.

FIGS. 9A and 9B are graphs showing $V_B$ for the two optical fibers used in the example of FIG. 8.

DETAILED DESCRIPTION OF THE INVENTION

The present invention utilizes a pair of fibers connected or installed together, with one of the fibers having a refractive index that differs from that of the other fiber. For example, a first fiber uses pure silica as the cladding and pure silica doped with Ge as the core, and the second fiber uses pure silica doped with F as the cladding and pure silica as the core. Another example has a first fiber using pure silica as the cladding and pure silica doped with Ge as the core, and a second fiber using pure silica as the cladding and pure silica doped with a different dose of Ge as the core, such as SMF-28 and LEAF. Preferred fibers for this invention are single mode fibers (SMF), because they are cheaper and more conventional. The fibers are connected together at least one end thereof and laser light will be pumped into at least one of the fibers, with suitable means being provided for measuring the Brillouin frequencies of the respective fibers.

Figure 2:
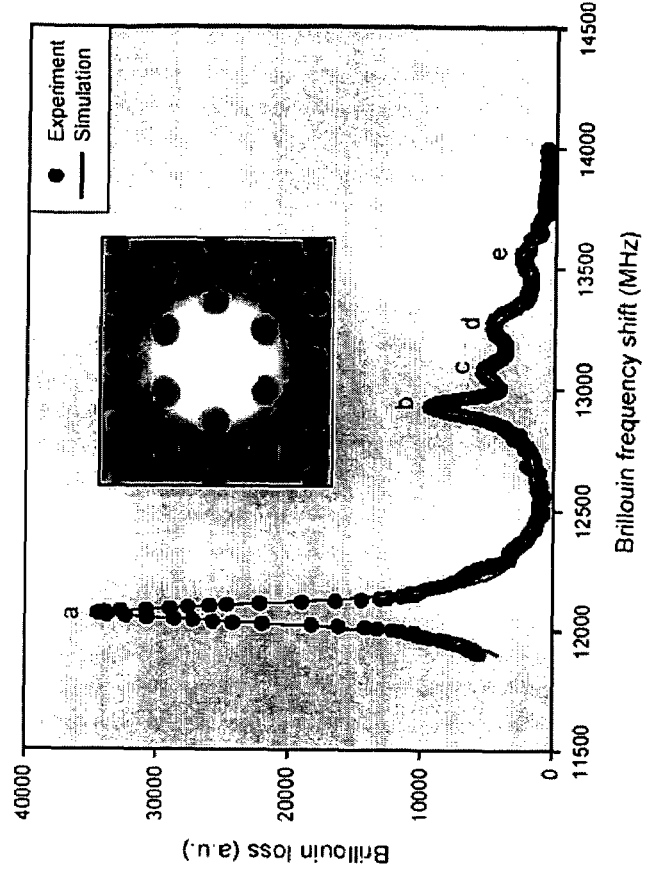
FIG. 2 is a graph showing Brillouin loss as a function of the Brillouin frequency shift for PC and LEA fibers.
Figure 4:
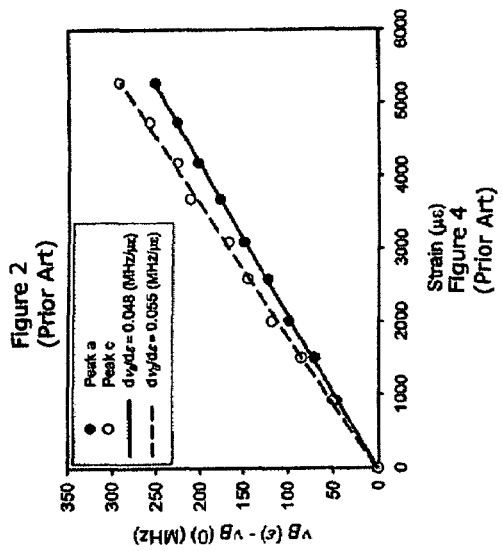
FIG. 4 is a graph showing the effect of strain on Brillouin measurements.
Figure 1:
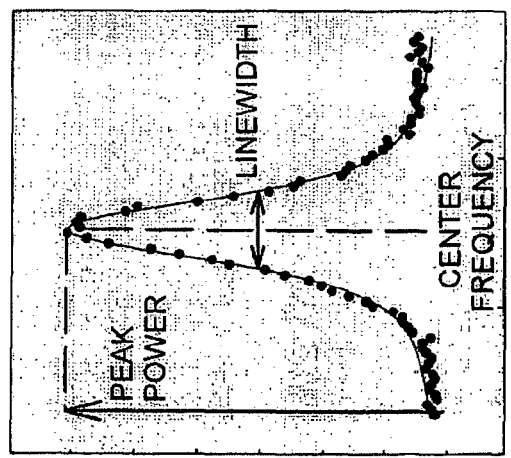
FIG. 1 is a graph showing the Brillouin frequency spectrum of an optical fiber as well as the peak power thereof.
Figure 3:
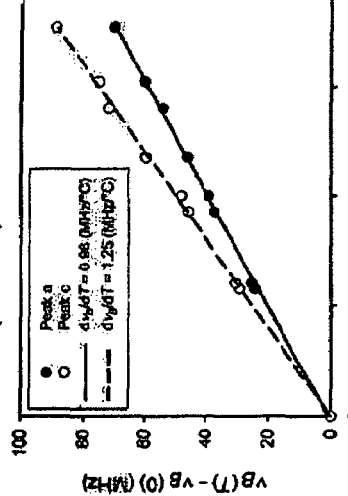
FIG. 3 is a graph showing the effect of temperature on Brillouin measurements.
Figure 5:
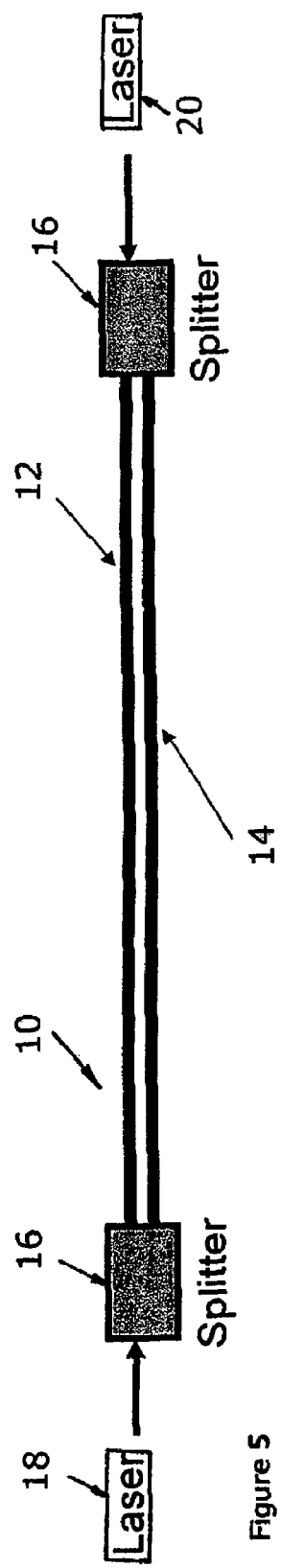
FIG. 5 shows a first arrangement of optical fibers in accordance with the present invention.

FIG. 5 shows a first example 10 of first 12 and second 14 single mode fibers connected to a splitter 16 at each end, with the splitters being used as input/output or inputs of probe and pump lasers 18, 20.

FIGS. 6a and 6b show alternative arrangements 22, 24 of first 26 and second 28 single mode fibers spliced together at one end 30, with the other ends 32 being used for input/output of a single laser 34 or inputs of probe and pump lasers 36, 38.

In each of these examples the first and second single mode fibers have different refractive indices.

Each of the two fibers will provide one peak of the Brillouin spectrum but the two Brillouin spectra will have different Brillouin frequencies. The two peaks coming from the two fibers will have different strain coefficients $C_\epsilon$ and temperature coefficients $C_T$. These two peaks are associated with a single set of local strain and temperature information.

The following set of equations can be used to solve for both the strain and temperature as detected in the pair of fibers:

$$\begin{bmatrix} \Delta v_B^{pk1} \\ \Delta v_B^{pk2} \end{bmatrix} = \begin{bmatrix} C_\epsilon^{pk1} & C_T^{pk1} \\ C_\epsilon^{pk2} & C_T^{pk2} \end{bmatrix} \begin{bmatrix} \Delta \epsilon \\ \Delta T \end{bmatrix} \quad (3)$$

where $\Delta v_B^{pk1(2)} = v_B^{pk1(2)}(\epsilon, T) - v_{B0}^{pk1(2)}(\epsilon_0, T_0)$, $\Delta \epsilon = \epsilon - \epsilon_0$, $\Delta T = T - T_0$, $\epsilon_0$ and $T_0$ are the strain and temperature corresponding to a reference Brillouin frequency $v_{B0}^{pk1(2)}(\epsilon_0, T_0)$. If the strain coefficients $C_\epsilon^{pk1}$ and $C_\epsilon^{pk2}$ and temperature coefficients $C_T^{pk1}$ and $C_T^{pk2}$ for peaks 1 and 2, respectively, satisfy $$\begin{vmatrix} C_\epsilon^{pk1} & C_T^{pk1} \\ C_\epsilon^{pk2} & C_T^{pk2} \end{vmatrix} \neq 0, \quad (4)$$

the change in temperature $\Delta T$ can be given by $$\Delta T = \frac{\Delta v_B^{pk2} \cdot C_\epsilon^{pk1} - \Delta v_B^{pk1} \cdot C_\epsilon^{pk2}}{C_\epsilon^{pk1} \cdot C_T^{pk2} - C_\epsilon^{pk2} \cdot C_T^{pk1}}, \quad (5)$$

and the change in fiber strain can also be obtained by $$\Delta \epsilon = \frac{\Delta v_B^{pk1} \cdot C_T^{pk2} - \Delta v_B^{pk2} \cdot C_T^{pk1}}{C_\epsilon^{pk1} \cdot C_T^{pk2} - C_\epsilon^{pk2} \cdot C_T^{pk1}}. \quad (6)$$

Figure 7A:
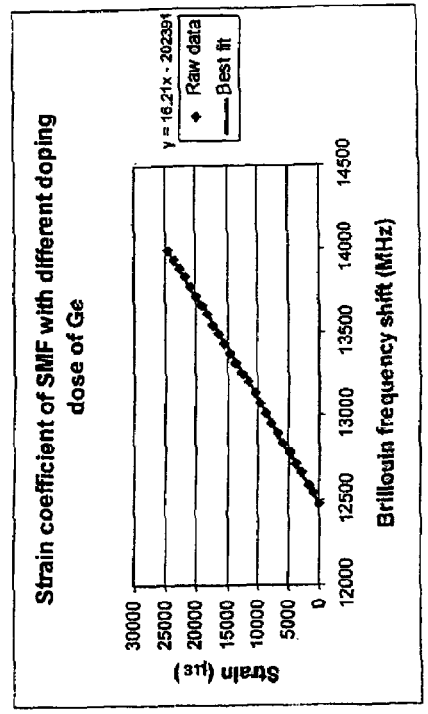
FIGS. 7A and 7B are graphs showing strain coefficients for optical fibers having different refractive indices in an arrangement of the present invention.
Figure 7B:
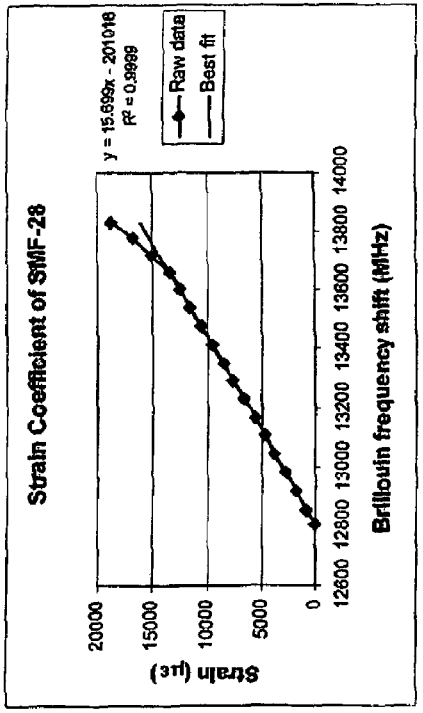
Figure 8:
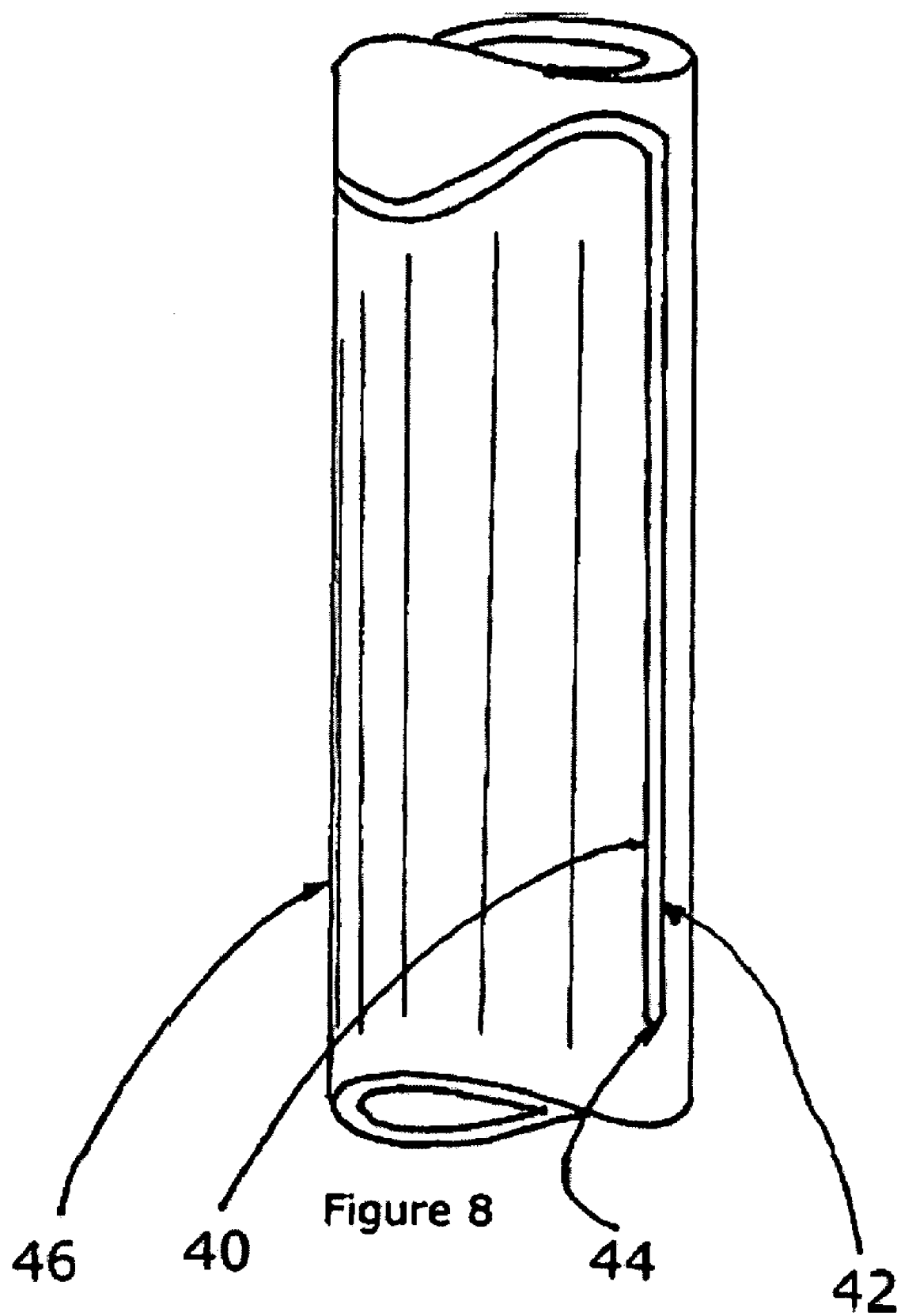
FIG. 8 shows a pair of optical fibers in accordance with the present invention, spliced together at one end and installed on a section of a steel pipeline.

A practical example of the present invention would involve monitoring a steel pipeline to ascertain strain and temperature characteristics thereof in order to predict whether the pipeline would be susceptible to buckling. Two differ kinds of single mode fiber are utilized, one being SMF-28, and the other being a single mode fiber with a different doping dose of Ge. There are different central Brillouin frequencies at room temperature, namely 12796 MHz for SMF-28 and 12479 MHz for the other fiber, as well as different strain and temperature coefficients (see FIGS. 7A and 7B). The two fibers 40, 42 are spliced together at one end 44 and then installed on a steel pipeline 46 (FIG. 8).

When laser beams are directed into the fibers there will be two Brillouin spectra corresponding to the two fibers appearing at the same real location, but in the time domain they will appear at different times because the fibers were spliced together at one end. FIGS. 9A and 9B show that $V_B$ for the SMF-28 fiber is 12980 MHz at 354.5 ns, whereas $V_B$ for the other fiber is 12935 at 412 ns. This data, when utilized in the previous equations will determine the strain and temperature characteristics of the pipeline at a single point in time, to help determine whether the operating conditions of the pipeline are well within standard acceptable conditions.

The invention claimed is:

1. A method of simultaneously determining strain and temperature characteristics of an object comprising the steps of:
providing first and second optical fibers having different refractive indices;
determining coefficients of strain and temperature for each of said fibers;
connecting said fibers together at at least one end thereof;
securing said fibers to said object along a length thereof;
inputting laser light into at least one of said fibers at the other ends thereof;
measuring the Brillouin frequency for each of said fibers; and
calculating strain and temperature characteristics based on the coefficients of strain and temperature and the measured Brillouin frequencies for said fibers.

2. The method of claim 1 wherein each of the fibers is a single-mode optical fiber.

3. The method of claim 2 wherein one of the fibers has a cladding of pure silica and a core of pure silica doped with Ge and the other of the fibers has a cladding of pure silica doped with F and a core of pure silica.

4. The method of claim 2 wherein one of the fibers has a cladding of pure silica and a core of pure silica doped with Ge, and the other of the fibers has a cladding of pure silica and a core doped with Ge at a concentration different from that of the one fiber.

5. The method of claim 1 including the step of connecting each of said fibers to a splitter at each end thereof and directing the laser light into said fibers at each of said splitters.

6. The method of claim 1 including the step of splicing said fibers together at one end only and directing the laser light into the other end of one of the fibers.

7. The method of claim 1 including the step of splicing said fibers together at one end only and directing laser light from two individual lasers into the other end of respective individual ones of the fibers.

8. A system for simultaneously determining strain and temperature characteristics of an object comprising:
first and second optical fibers having different refractive indices;
means connecting said first and second fibers together at at least one end thereof;
means securing said fibers to the object to be monitored;
laser means for inputting laser light into at least one of said fibers at the other ends thereof;
means for measuring the Brillouin frequency for each of said fibers; and
means for calculating strain and temperature characteristics based on the coefficients of strain and temperature as well as the measured Brillouin frequencies for said fibers.

9. The system of claim 8 wherein each of the fibers is a single-mode optical fiber.

10. The system of claim 9 wherein one of the fibers has a cladding of pure silica and a core of pure silica doped with Ge and the other of the fibers has a cladding of pure silica doped with F and a core of pure silica.

11. The system of claim 9 wherein one of the fibers has a cladding of pure silica and a core of pure silica doped with Ge, and the other of the fibers has a cladding of pure silica and a core doped with Ge at a concentration different from that of the one fiber.

12. The system of claim 8 wherein the fibers are connected to a splitter at each end thereof and the laser light is directed into said fibers at each of said splitters.

13. The system of claim 8 wherein the fibers are spliced together at one end only and the laser light is directed into the other end of the fibers.

* * * * *